United States Patent Office 2,892,678
Patented June 30, 1959

2,892,678

METHOD OF MAINTAINING PLUTONIUM IN A HIGHER STATE OF OXIDATION DURING PROCESSING

Stanley G. Thompson and Daniel R. Miller, Richmond, Calif., assignors to the United States of America as represented by the United States Atomic Energy Commission No Drawing. Application December 2, 1947
Serial No. 789,333

10 Claims. (Cl. 23—14.5)

This invention is concerned with the separation of plutonium from other elements normally associated with it in a neutron-irradiated uranium mass, and more particularly with an improvement in the oxidation-reduction type of plutonium separation process.

Plutonium is the transuranic element of atomic number 94. Plutonium is not found in appreciable quantities in nature and is produced artificially by the neutron-irradiation of uranium. The plutonium thus produced is a very small part of the uranium mass, usually not exceeding 250 parts per million. The great bulk of the mass is made up of $U^{238}$ with smaller quantities of $U^{235}$ and radioactive fission products. These fission products are isotopes of elements with atomic numbers between about 32 and 65. The total amount of fission products formed as a by-product of plutonium production is small, usually approximately equal to the amount of plutonium contained in the neutron-irradiated mass. For most purposes it is necessary to separate the plutonium, fission products and uranium. One particularly important use of fission products is in tracer research in chemical, medical and related fields.

An excellent method of separation has been found, base upon the oxidation and reduction of plutonium contained in acid solutions. Plutonium may exist in acid solution in at least three valence states: the +3, +4, and +6 states. It has been found that compounds formed with certain anions and quadrivalent plutonium ions are insoluble in acid solutions, while the corresponding hexavalent plutonium compounds are soluble. For example, quadrivalent plutonium forms insoluble precipitates in dilute nitric acid with ions of phosphate, fluoride and oxalate, but the hexavalent plutonium ion is soluble in dilute nitric acid solutions containing these anions. The hexavalent plutonium uranyl acetate compound, however, is insoluble in acid solutions. In basic solutions, both quadrivalent and hexavalent plutonium ions tend to form insoluble hydroxides. The difference between the solubilities of analogous Pu(IV) and Pu(VI) compounds in acid solutions forms the basis for the oxidation-reduction plutonium separation method most widely used.

The oxidation-reduction plutonium separation method may be best illustrated by describing briefly the procedure followed in one of these methods, the bismuth phosphate-lanthanum fluoride separation process. The uranium mass, following neutron-irradiation and a period of aging, is dissolved in concentrated nitric acid, thus forming a uranyl nitrate hexahydrate solution. This solution is then diluted, and treated with a selective reducing agent which reduces the plutonium to the quadrivalent state, but does not reduce the hexavalent uranium. A bismuth phosphate precipitate is formed in, and separated from the solution, carrying with it the plutonium and certain of the fission products which form insoluble phosphates. The carrier precipitate technique is used in this process because the plutonium is present in such a small concentration that it cannot be precipitated directly, at this stage of the procedure. A carrier precipitate which carries plutonium is usually referred to as a "product precipitate"; while a carrier precipitate which removes elements other than plutonium, leaving the plutonium in solution, is usually referred to as a "by-product precipitate." The bismuth phosphate product carrier precipitate is then dissolved, usually in 10 N nitric acid, and the plutonium contained in the solution is oxidized to the hexavalent state. A bismuth phosphate by-product carrier precipitate is formed in the solution, usually by diluting the solution to an acidity at which bismuth phosphate will precipitate and adding phosphate ion to the solution, and the precipitate is separated from the solution. This carries phosphate-insoluble fission products from the solution and the phosphate-soluble hexavalent plutonium ions remain in solution. Following the separation of the by-product carrier precipitate from the solution, the plutonium is reduced to the quadrivalent state and separated from the solution with a bismuth phosphate carrier precipitate. These operations: plutonium oxidation, by-product carrier precipitation, plutonium reduction and product carrier precipitation, form a cycle and this cycle may be repeated as often as necessary to achieve the decontamination desired. The word "decontamination" as here used refers to the separation of radioactive fission products from plutonium.

The plutonium is then concentrated by dissolving the bismuth phosphate plutonium carrier in nitric acid, the plutonium is oxidized to the hexavalent state, and a bismuth phosphate precipitate is formed in, and separated from, the solution. The plutonium in the solution is then reduced to the quadrivalent state and is separated from the solution with a product carrier precipitate of lanthanum fluoride. This lanthanum fluoride precipitate is usually metathesized with an alkali hydroxide or carbonate solution to form a mixed lanthanum-plutonium hydroxide, which may be dissolved in a much smaller quantity of acid than in the preceding step, and the plutonium may be precipitated directly from this solution without a carrier.

This outline of the bismuth phosphate-lanthanum fluoride process for the separation of plutonium is an example of the oxidation-reduction type plutonium separation method but this particular example and the general method are both capable of many variations.

One very important feature of the oxidation-reduction type plutonium separation process is the plutonium oxidation step. Any oxidation of the plutonium must be complete, since the concentration of the plutonium is so small, and the number of operations in a complete process so large, that any inefficiency of oxidation would result in unduly large plutonium losses. There are certain limitations on the present bismuth phosphate process. The oxidation is carried out in an acid solution and the plutonium must be maintained in the hexavalent state while a by-product precipitation is carried out. In the decontamination cycle an additional limitation is that the H+ ion concentration must not fall below the point at which the $BiPO_4$ present will precipitate during the oxidation step since the $BiPO_4$ would carry with it quadrivalent plutonium and it has been found that quadrivalent plutonium contained in a solid phase of bismuth phosphate is not readily oxidized.

A great deal of research was carried out in an effort to find a suitable oxidizing agent. The stronger oxidizing agents, such as silver catalyzed peroxydisulfate, argentic compounds, ceric compounds, and cobaltic compounds were tried first. While some of these were moderately satisfactory on laboratory scale operations, it was found that they all had certain disadvantages, particularly when used in large scale operations. It was found that such oxidizing agents as sodium bismuthate, peroxydisulfate, and argentic ions readily oxidize the plutonium to the hexavalent state in strong acid solutions but that these oxidizing agents tended to decompose rapidly, thus oxidizing the stainless steel walls of the equipment as well as the plutonium and causing undue corrosion of the equipment. Following the decomposition of the oxidizing agent a substantial portion of the plutonium was often reduced to the tetravalent state, so that there were losses of plutonium with the bismuth phosphate by-product precipitate when it was removed from solution. These losses were particularly large when the solution was contained in stainless steel equipment. The strong oxidizing agents were, on the whole, found to be expensive and difficult to procure in the quantities necessary. Losses of plutonium were particularly high where such oxidants as bismuthate and ceric ion were used and where the oxidized solution was allowed to stand for several hours between oxidation and by-product precipitation.

Weak oxidants were also tried and it was found that these caused greater difficulties than strong oxidants in this process. Such oxidants as dichromate and permanganate ion were strong enough to oxidize plutonium to the hexavalent state but the conditions required made their use impractical. Dichromate and permanganate could be used to oxidize plutonium to the hexavalent state, but only at the lower acid concentrations with high temperatures and prolonged digestion periods. The dichromate ion, for example, required approximately one hour at 95° C. in 4 N acid solution and two hours at 95° C. in 5 N acid solution and failed completely to oxidize plutonium in 10 N nitric acid. The time and temperature required for these weak oxidants to oxidize plutonium resulted in undue corrosion of the stainless steel equipment and excessive hold-up in the process operations.

An object of this invention is to provide a suitable method for oxidizing plutonium to the hexavalent state in acid solution and for maintaining plutonium in the hexavalent state during a by-product precipitation.

An additional object of this invention is to provide such a method for oxidizing plutonium, suitable for use in large scale operations in stainless steel containers.

Additional objects of this invention will be apparent from the description which follows:

We have discovered a method for oxidizing plutonium in a lower valence state, contained in an acid solution together with contaminants, and for maintaining the plutonium in the oxidized hexavalent state during the formation and separation of a by-product precipitate from said solution, which comprises treating said plutonium with a strong oxidizing agent in excess of that stoichiometrically required to oxidize the plutonium present to the hexavalent state, and with a quantity of a weaker oxidizing agent sufficient to maintain the plutonium in the hexavalent state during the formation and separation of a by-product precipitate. The term "strong oxidizing agent" as used herein refers to an oxidizing agent having an oxidation potential more negative than about $-1.55$ volts, as shown in tables of standard oxidation-reduction potentials, such as the table contained in the Reference Book of Inorganic Chemistry by Latimer and Hildebrand (The MacMillan Co., 1940). The term "weak oxidizing agent" refers to an oxidizing agent having an oxidation-reduction potential between about $-1.15$ and $-1.55$ volts.

The process of this invention has been found to be particularly effective in reducing losses in the by-product precipitation of the decontamination cycle of the oxidation-reduction plutonium separation processes. The strong oxidizing agent is effective to oxidize the plutonium to the hexavalent state in acid solutions in the presence of fairly high hydrogen ion concentration, without the necessity for long digestion periods at high temperatures. A weak oxidation agent introduced into the solution does not decompose readily and has sufficient oxidizing potential to maintain the plutonium in the hexavalent state for long periods with no appreciable reduction of the $Pu^{+6}$. Weaker oxidizing agents thus counteract the reduction of plutonium which takes place on the decomposition of strong oxidizing agents, and which takes place particularly when the solution is in contact with the walls of stainless steel equipment. An additional advantage of this process is that a water-insoluble strong oxidant may be used, provided that a water-soluble holding oxidant is used with it, since the holding oxidant will remain in solution and hold the plutonium in the hexavalent state, even after the removal of the strong oxidant with the by-product precipitate.

Strong oxidizing agents which have been found to be suitable for use in this process include argentic ions, silver catalyzed peroxydisulfate ions, bismuthate ions, ceric ions, and cobaltic ions. Most of these strong oxidizing agents are expensive and difficult to procure in large quantities; therefore the process of this invention is highly desirable because smaller quantities of these expensive oxidants are required than would be the case if they were used alone for the oxidizing procedure. The undesirable by-products introduced into the solution by the decomposition by some of these strong oxidizing agents is also avoided by the process of this invention, since the by-products are tolerable in the smaller quantities required by the process of this invention.

The strong oxidants which have been found to be preferable for use in the bismuth phosphate-lanthanum fluoride separation process are the bismuthate ion and ceric ion. The bismuthate ion is usually introduced into the plutonium-containing solution as an alkali metal bismuthate, for example, sodium bismuthate. The alkali bismuthates are insoluble in aqueous acidic solutions so that the bismuthate is introduced as a slurry. It will therefore be apparent that when the bismuth phosphate or lanthanum fluoride by-product precipitate is formed in this solution, the alkali bismuthate will be carried down with the by-product precipitate and separated from the solution with it. The ceric ion is usually introduced into the solution as the soluble ceric ammonium nitrate, or a dilute nitric acid solution of it. Ceric phosphate, however, is insoluble under the conditions used to precipitate bismuth phosphate in the solution and the ceric ion is therefore co-precipitated with the bismuth phosphate by-product precipitate as ceric phosphate, thus removing the ceric ions from the solution. It is, therefore, necessary that the holding oxidant used with either of these initial oxidants be water-soluble under the conditions of the bismuth phosphate or lanthanum fluoride by-product precipitation. Both the dichromate and permanganate ions are weak oxidants which are soluble under the conditions required for the by-product precipitation. Of these two, we have found that the dichromate gives preferable results, since it has adequate potential to maintain the hexavalent plutonium in its oxidized state, but the potential is less negative than that of the permanganate and therefore the dichromate has a smaller tendency to corrode the surface of stainless steel equipment.

The amount of oxidant used is dependent upon the amount of plutonium present. It has been found desirable, however, to use at least the stoichiometric amount required to oxidize the plutonium present, and if the plutonium is present in very small concentration with respect to the carrier precipitate, it may be desirable to use at least double the stoichiometric amount indicated. For example, in the decontamination cycle of the bismuth phosphate process where the plutonium is usually present in about $10^{-5}$ M concentration, it has been found that for initial oxidation, bismuthate in 0.002 to 0.02 M quantities has been preferable. About the same molarity of the ceric ion as of the bismuthate ion has been found to be satisfactory. It will be noted that the ions formed by the decomposition of bismuthate are already present in the bismuth phosphate solution so that any excess of bismuthate will not introduce undesirable ions into the solution. Where the ceric ion is used as initial oxidant with a dichromate holding oxidant, the quantity of the ceric ion may be slightly reduced without reaching a critical limit, since the ceric ion acts as a catalyst for the dichromate ion, thus increasing the over-all oxidizing power of the ceric-dichromate oxidizing agent.

The holding oxidant may be added at the same time as the initial oxidant or it may be added subsequently, but prior to the formation of the by-product precipitate. It has been found preferable to introduce the holding oxidant at the same time as the initial oxidant in most cases. The dichromate is introduced as any soluble dichromate salt and the alkali metal dichromates have been found to be particularly desirable. The permanganate is usually introduced as the potassium salt. The quantity of holding oxidant required depends upon a number of factors. The most important of these are the time which will elapse before separation of the by-product precipitate, the temperature at which the oxidation is carried out, and the amount of reducing agent present, particularly the amount of stainless steel equipment walls in contact with the solution. Where sodium bismuthate has been used as the initial oxidant with plutonium present in concentrations of $10^{-5}$ M and the bismuth phosphate by-product precipitate was separated two hours after the initial oxidation, 0.002 M dichromate has been found to give entirely satisfactory results. Under similar conditions, but with ceric ion as the initial oxidant rather than with the sodium bismuthate, a somewhat higher concentration of dichromate has been found to be desirable such as 0.01 M. The quantity of the holding oxidant is not particularly critical since an excess of oxidant introduces no undesirable effects and additional oxidant may be easily introduced from time to time as needed to maintain the plutonium in the hexavalent state.

The acidity of the solution in which the oxidation is carried out, the time required for the oxidation, and the temperature of the solution in which the oxidation is carried out are all interdependent. The most important of these is the acidity of the solution. In the decontamination cycle of the bismuth phosphate process, for example, the bismuth phosphate plutonium-containing cake is dissolved in 10 N nitric acid. However, if the nitric acid solution containing the bismuth phosphate is diluted to less than 1 N HNO₃, the bismuth phosphate will re-precipitate under normal conditions. Tests have shown that plutonium contained in a solid bismuth phosphate phase is not readily oxidized. It is, therefore, desirable that the oxidation of plutonium be carried out in a solution of at least 2 N acid concentration. Ceric phosphate is more insoluble than bismuth phosphate and will precipitate in solutions containing a somewhat higher hydrogen ion concentration. Solid ceric phosphate, however, does not inhibit the oxidation of plutonium in a bismuth phosphate solution and with the precipitation of ceric phosphate, sufficient phosphate ion is removed from the bismuth phosphate solution so that bismuth phosphate will require a lower hydrogen ion concentration to precipitate than would normally be the case. It has therefore been found practical to oxidize plutonium with a ceric ion initial oxidant at an acidity as low as 1.5 N hydrogen ion concentration. With bismuthate, however, the practical lower limit of hydrogen ion concentration has been found to be about 2 N. Both bismuthate and ceric ion will oxidize plutonium in 10 N nitric acid solution; but for practical purposes, it has been found best to carry out the oxidation at not greater than 8.5 N nitric acid concentration. At any given temperature the rate of bismuthate decomposition increases with increasing acidity and at any given acidity the rate of decomposition increases with increasing temperature. The presence of dissolved bismuth phosphate decreases the rate at which sodium bismuthate is decomposed and the presence of sodium dichromate slightly increases the decomposition rate. Using 0.01 M sodium bismuthate, the range of acidity in which oxidation is complete within one hour is 1 to 8.5 N. In 1 N acid the temperature must be increased to 75° C. to obtain appreciable bismuthate decomposition. In 8.5 N acid the temperature must be reduced to 40–45° C. to prevent too rapid bismuthate decomposition. For practical purposes, the preferable acidity for oxidation with bismuthate is about 3.5 to 8.5 N, with best results being obtained in the range of about 4 to 6 N. The preferred range for ceric ion oxidation is somewhat lower, about 2 to 5 N. The temperature, as pointed out above, depends upon the acidity at which the oxidation is carried out and upon the quantities of oxidant used. It has been found preferable to maintain the temperature between 40–80° C. if other considerations permit, since a lower temperature requires too long a time for oxidation and a higher temperature causes undue corrosion of the process vessels. In the preferred ranges for temperature, acidity, and oxidant concentrations given above, one-half hour has been found to give complete oxidation in all cases; however, should any of these factors be varied beyond the preferred range, additional time of digestion may be required to compensate for the other variations, and at least one hour is usually given in large scale operations to provide an additional safety factor.

Now that the variables of this process have been discussed generally, these may be further illustrated by the several examples which follow. The first example is concerned with the oxidation of plutonium from the tetravalent to the hexavalent state on a laboratory scale, using ceric ion as the initial oxidant and dichromate ion as the holding oxidant.

EXAMPLE I

A solution of 2 N nitric acid was made up containing bismuth ion, quadrivalent plutonium ion in tracer amounts and to this solution was added $Ce(NH_4)_2(NO_3)_6$ in quantity to make the solution 0.002 M in ceric ion. Aliquots were taken from the initial solution and dichromate was added to three of these to give the concentrations shown in the table. The solutions were then digested for one-half hour at the temperatures shown by the following table. The results are shown in this table.

*Table I*

[Oxidation of Pu by $Ce^{+4}$, and by $Ce^{+4}$ and $K_2Cr_2O_7$
(0.002 M $Ce^{+4}$, Time=½ hour).]

| $K_2Cr_2O_7$ Conc. | $HNO_3$ Conc. | Temp., ° C. | Percent Pu Oxidized |
|---|---|---|---|
| 0 | 2 N | 70–80 | 77.3 |
| 0.01 M | 2 N | 70–80 | 95.7 |
| 0.02 M | 2 N | 73 | 96.8 |
| 0.03 M | 2 N | 73 | 97.1 |

The use of the ceric and dichromate ion combination for oxidation in the decontamination cycle of the bismuth phoshpate plutonium separation process is also illustrated by the following example on laboratory scale.

EXAMPLE II

Twenty-five mg. of bismuth precipitated as bismuth phosphate and containing tracer quantities of plutonium in the quadrivalent state was dissolved in 1 cc. of 10 N nitric acid. One and four-tenths mg. of ceric ion was added as a solution of $(NH_4)_2Ce(NO_3)_6$ and the solution was diluted to 5 cc. with $H_2O$, and made 0.02 M in dichromate ion, then heated at 75° C. for two hours to effect oxidation of the plutonium to the hexavalent state. A bismuth phosphate by-product precipitation was carried out in the solution by diluting the oxidized solution to 1 N in $HNO_3$ with 0.3 M $H_3PO_4$ solution. Bismuth and ceric phosphates precipitated and were separated from the solution. The supernatant liquid containing the oxidized plutonium was then contacted with $SO_2$ to reduce the plutonium to the quadrivalent state and a lanthanum fluoride plutonium carrier precipitate formed in and separated from the solution. This precipitate was analyzed by radiometric methods and was found to contain 99% of the plutonium originally present.

The use of the process of this invention on a large scale is demonstrated by the following example in which bismuthate ion is the initial oxidant and dichromate ion is used as a holding oxidant.

EXAMPLE III

Eighty-eight lbs. of bismuth phosphate precipitate containing 1.34 lbs. of quadrivalent plutonium nitrate and 0.02 lbs. radioactive fission products was dissolved in 238 gal. of 60% $HNO_3$ and sufficient water added to give a 10 N nitric acid solution. The resulting solution comprising 305 gal. was then diluted by adding 108 gal. of water to give a 6.6 M nitric acid solution. To this solution was added 14 gal. of 10% $NaBiO_3$ slurry and 6 gal. of 10% $Na_2Cr_2O_7$ solution. This solution was digested for one hour at 45° C. with agitation, thus effecting the oxidation of the plutonium present to the hexavalent state. The solution was then cooled to 35° C. A by-product precipitate was then formed in the solution by the following steps: 1650 gal. of water was added to the plutonium-containing solution and the solution was heated to 40° C. with agitation. Eleven gallons of a 24% $BiONO_3$ solution was added to the oxidized solution and it was heated to 75° C. and digested for one hour. The oxidized solution was then permitted to cool to 35° C. and 2.8 gal. of 10% sodium dichromate added to the solution. A scavenger was introduced into the solution by adding 8 gal. of a cerium-zirconium solution containing 3.6% of $ZrO(NO_3)_2$ and 5.6% $(NH_4)_2Ce(NO_3)_6$. The solution was agitated for ten minutes at 35° C. and 267 lbs. of 73.5% $H_3PO_4$ solution was added. The bismuth phosphate precipitate thus formed was digested for one hour at 35° C. and then separated from the solution. The supernatant solution was tested for hexavalent plutonium and found to contain 98.6% of the plutonium originally present in the first bismuth phosphate precipitate.

The process of this invention has been described with particular reference to its use in the decontamination cycle of the bismuth phosphate-lanthanum fluoride plutonium separation process. Its uses, however, are much broader than the cycle of this process. For example, it may be used equally well where the by-product precipitate is a lanthanum fluoride precipitate, such as in the concentration step of the bismuth phosphate-lanthanum fluoride process. It may be also used in many variations of the oxidation-reduction plutonium separation process, particularly where other carriers than bismuth phosphate and lanthanum fluoride are used, such as uranyl acetate or thorium iodate.

In general, it may be said that any equivalents or modifications of procedure which would naturally occur to those skilled in the art are included in the scope of the present invention.

What is claimed is:

1. The method of oxidizing plutonium, which comprises treating plutonium in an oxidation state not greater than +4 contained in an aqueous acidic solution with a strong oxidizing agent selected from the group consisting of bismuthate ions and ceric ions and a water-soluble dichromate as a relatively weaker oxidizing agent, either of said oxidizing agents being present in an amount greater than the stoichiometric equivalent of the plutonium.

2. The method of oxidizing plutonium, which comprises treating plutonium in an oxidation state not greater than +4 contained in a nitric acid solution between 1 and 10 N with a strong oxidizing agent selected from the group consisting of bismuthate ions and ceric ions in amount greater than the stoichiometric equivalent of the reduced plutonium present and a water-soluble dichromate as a relatively weaker oxidizing agent in amount greater than the stoichiometric equivalent of the reduced plutonium present.

3. The method of oxidizing plutonium, which comprises treating plutonium ions in an oxidation state not greater than +4 contained in an aqueous nitric acid solution between 2 and 8.5 N with an oxidizing agent selected from the group consisting of bismuthate ions and ceric ions in amount greater than a stoichiometric equivalent of the reduced plutonium present and a stoichiometric amount of a water-soluble dichromate as a relatively weaker oxidizing agent for more than thirty minutes at a temperature between 20 and 95° C.

4. The process of claim 3 wherein the strong oxidizing agent is ceric ion.

5. In a process for recovering plutonium from foreign products in an aqueous acidic solution by forming a by-product carrier precipitate in said solution capable of carrying said foreign products with said precipitate, but incapable of carrying hexavalent plutonium, the improvement which comprises treating the plutonium contained in the solution with an oxidizing agent selected from the group consisting of bismuthate ions and ceric ions in amount stoichiometrically in excess of that required to oxidize the plutonium present to the hexavalent state, and with a water-soluble dichromate in amount sufficient to maintain the plutonium in the hexavalent state during the formation and separation of the by-product precipitate carrier.

6. In a process for recovering plutonium from foreign products in an aqueous acidic solution by forming a precipitate in said solution capable of carrying said foreign products with said precipitate, but incapable of carrying hexavalent plutonium, the improvement which comprises treating the plutonium, contained in an aqueous nitric acid solution between 1 and 10 N, with an oxidizing agent selected from the group consisting of bismuthate ions and ceric ions in amount greater than the stoichiometric equivalent of the reduced plutonium present and with a water-soluble dichromate in amount greater than the stoichiometric equivalent of the reduced plutonium present.

7. In a process for recovering plutonium from foreign products contained in an aqueous acidic solution by forming a precipitate in said solution capable of carrying hexavalent plutonium, the improvement which comprises treating the plutonium contained in said solution with a strong oxidizing agent selected from the group consisting of bismuthate ions and ceric ions in amount sufficient to make the solution more than 0.002 M in said strong oxidizing agent and with a water-soluble dichromate for more than one-half hour at a temperature between 20 and 95° C.

8. The process of claim 7 wherein the strong oxidizing agent is ceric ion.

9. In a process for recovering plutonium from foreign products in an aqueous acidic solution by forming a precipitate in said solution, in the presence of ferrous metal, capable of carrying said foreign products with said precipitate, but incapable of carrying hexavalent plutonium, the improvement which comprises treating the plutonium contained in said solution with an oxidizing agent selected from the group consisting of bismuthate ions and ceric ions and with a water-soluble dichromate.

10. In a process for recovering plutonium from foreign products contained in a solution between 2 and 9 N in nitric acid by forming a precipitate in said solution, in the presence of ferrous metal, capable of carrying said foreign products with said precipitate but incapable of carrying hexavalent plutonium, the improvement which comprises treating the plutonium contained in said solution with sufficient ceric ion to make the solution more than 0.002 M in ceric ion and with sufficient water-soluble dichromate to make the solution more than 0.1

M in dichromate ion, and digesting the solution for more than one-half hour at a temperature between 40 and 75° C.

References Cited in the file of this patent

UNITED STATES PATENTS

| | | |
|---|---|---|
| 2,785,951 | Thompson et al. | Mar. 19, 1957 |
| 2,811,415 | Seaborg | Oct. 29, 1957 |

OTHER REFERENCES

Harvey et al.: "Journal of the Chemical Society," August 1947, pp. 1010–1021.

Seaborg et al.: "The Transuranium Elements," pages 250, 259, 298 (1954). Publ. by McGraw-Hill Book Co., N.Y.